United States Patent
Huang et al.

(10) Patent No.: US 8,958,358 B2
(45) Date of Patent: Feb. 17, 2015

(54) NETWORK ELEMENT FOR CHANGING THE TIMESLOT TYPE ACCORDING TO THE RECEIVED INFORMATION

(75) Inventors: Min Huang, Beijing (CN); Lei Du, Beijing (CN); Yong Teng, Beijing (CN)

(73) Assignee: Nokia Siemens Networks Oy, Espoo (FI)

( * ) Notice: Subject to any disclaimer, the term of this patent is extended or adjusted under 35 U.S.C. 154(b) by 504 days.

(21) Appl. No.: 13/380,582

(22) PCT Filed: Jun. 24, 2009

(86) PCT No.: PCT/EP2009/057915
§ 371 (c)(1),
(2), (4) Date: Dec. 23, 2011

(87) PCT Pub. No.: WO2010/149213
PCT Pub. Date: Dec. 29, 2010

(65) Prior Publication Data
US 2012/0093071 A1   Apr. 19, 2012

(51) Int. Cl.
*H04B 7/14* (2006.01)
*H04B 7/26* (2006.01)
*H04B 7/155* (2006.01)
(52) U.S. Cl.
CPC .......... *H04B 7/2606* (2013.01); *H04B 7/15542* (2013.01)
USPC ........................................ 370/315; 455/11.1
(58) Field of Classification Search
CPC ........................ H04B 7/2606; H04B 7/15542
USPC .......................... 370/315, 328, 280
See application file for complete search history.

(56) References Cited

U.S. PATENT DOCUMENTS

| 6,985,446 B1* | 1/2006 | Hurtta et al. | 370/249 |
| 7,349,665 B1* | 3/2008 | Zhu et al. | 455/11.1 |
| 8,284,669 B2* | 10/2012 | Jackson | 370/236 |
| 2003/0142657 A1* | 7/2003 | Forssell | 370/347 |
| 2005/0136835 A1* | 6/2005 | Suwa | 455/11.1 |
| 2005/0232135 A1* | 10/2005 | Mukai et al. | 370/208 |
| 2008/0043647 A1* | 2/2008 | Yoshida et al. | 370/280 |

(Continued)

FOREIGN PATENT DOCUMENTS

| EP | 0 689 303 A1 | 5/1994 |
| EP | 1 919 143 A2 | 5/2008 |
| WO | WO 2009/004552 A1 | 1/2009 |

OTHER PUBLICATIONS

3GPP TR 36.814 V.0.4.1 (Feb. 2009), "$3^{rd}$ Generation Partnership Project; Technical Specification Group Radio Access Network; Further Advancements for E-UTRA Physical Layer Aspects (Release 9)", 31 pgs.

*Primary Examiner* — Khaled Kassim
*Assistant Examiner* — Parth Patel
(74) *Attorney, Agent, or Firm* — Harrington & Smith

(57) ABSTRACT

It is described a mobile network, in particular an LTE network, including a relay node and a base station. The relay node is adapted for receiving signals from the base station during timeslots of a first type and for transmitting signals to a connected user equipment during timeslots of a second type differing from the first type of timeslots. The base station is adapted for transmitting signals to the relay node during timeslots of the first type and for sending information to the relay node indicating a change of the timeslot type. The relay node is further adapted for changing the timeslot type according to the received information.

12 Claims, 4 Drawing Sheets

(56) References Cited

U.S. PATENT DOCUMENTS

| | | |
|---|---|---|
| 2008/0069041 A1* | 3/2008 | Tandai et al. ............... 370/329 |
| 2008/0247372 A1* | 10/2008 | Chion et al. ................ 370/338 |
| 2008/0260000 A1* | 10/2008 | Periyalwar et al. .......... 375/133 |
| 2008/0285490 A1* | 11/2008 | Mukai et al. ................ 370/280 |
| 2008/0298474 A1* | 12/2008 | Charbit et al. .............. 375/241 |
| 2009/0040973 A1* | 2/2009 | Iwai et al. ................... 370/329 |
| 2009/0207815 A1* | 8/2009 | Parkvall et al. ............. 370/336 |
| 2009/0221231 A1* | 9/2009 | Weng et al. .................. 455/15 |
| 2010/0118730 A1* | 5/2010 | Tanaka et al. ............... 370/252 |
| 2010/0120360 A1* | 5/2010 | Haustein et al. ............. 455/15 |
| 2010/0195665 A1* | 8/2010 | Jackson ...................... 370/464 |
| 2011/0085523 A1* | 4/2011 | Tocze et al. ................. 370/337 |
| 2011/0103292 A1* | 5/2011 | Pasad et al. ................. 370/315 |
| 2011/0141916 A1* | 6/2011 | Inohiza ....................... 370/246 |
| 2011/0164527 A1* | 7/2011 | Mishra et al. ............... 370/252 |
| 2011/0261751 A1* | 10/2011 | Ode et al. .................... 370/315 |
| 2011/0268014 A1* | 11/2011 | Mildh et al. ................. 370/315 |
| 2012/0082052 A1* | 4/2012 | Oteri et al. ................... 370/252 |
| 2012/0082087 A1* | 4/2012 | Takano ........................ 370/315 |
| 2012/0170508 A1* | 7/2012 | Sawai .......................... 370/315 |
| 2012/0207085 A1* | 8/2012 | Guguen et al. .............. 370/324 |
| 2012/0320763 A1* | 12/2012 | Hong et al. .................. 370/246 |
| 2013/0115968 A1* | 5/2013 | Wegmann et al. ......... 455/452.1 |
| 2013/0343322 A1* | 12/2013 | Lee et al. ..................... 370/329 |

\* cited by examiner

⇒ backhaul link
→ access link

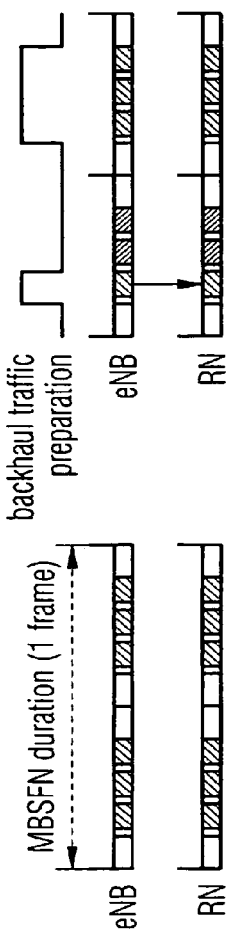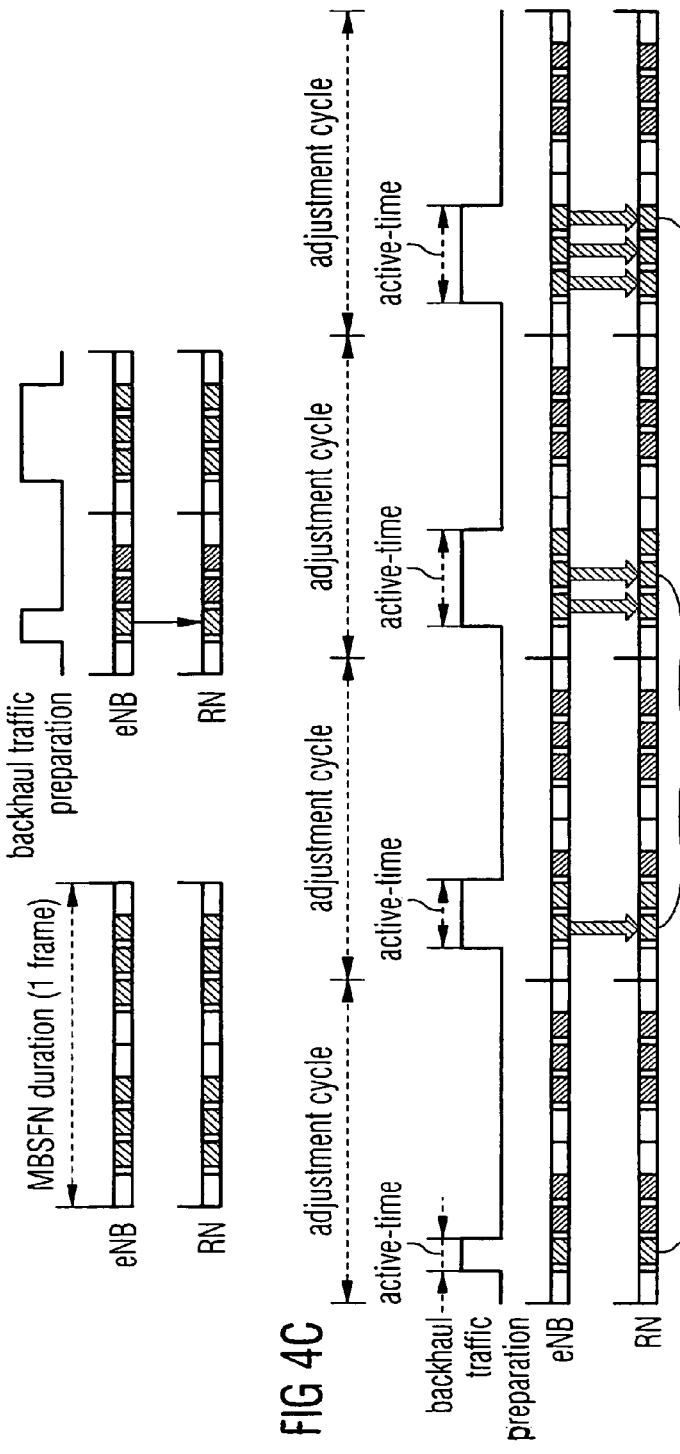

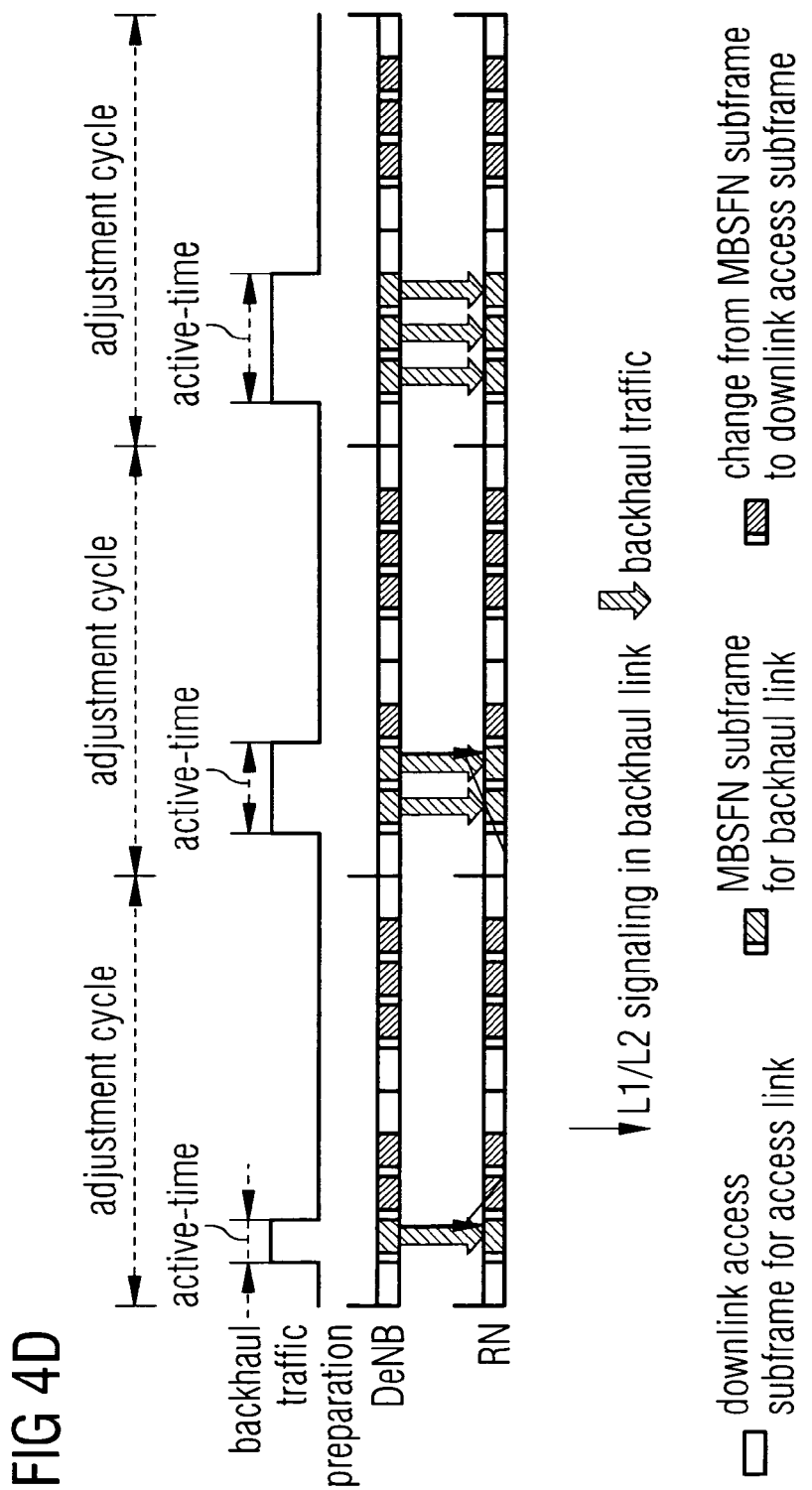

NETWORK ELEMENT FOR CHANGING THE TIMESLOT TYPE ACCORDING TO THE RECEIVED INFORMATION

FIELD OF INVENTION

The present invention relates to the field of transmitting and forwarding data between network elements in a mobile network, in particular in an LTE network. In particular, the present invention relates to a network element for changing the timeslot type according to the received information and to a mobile network, in particular an LTE network. Further, the present invention relates to method of changing a time-slot type according to a received information within a mobile network. Further, the present invention relates to a computer-readable medium and a program element, which are adapted for performing the above mentioned method.

ART BACKGROUND

A typical mobile communication network comprises one or more base stations and one or more user equipments. In particular, such a mobile communication network may be a UMTS, a 3GPP Long-Term-Evoultion (LTE) or 3GPP Long-Term-Evolution-Advanced network (LTE-A). Especially in RANs (radio access networks), the user equipments are connected to a base station directly or via a relay node. FIG. 1 illustrates a typical deployment scenario of LTE radio access network (RAN) with possible radio relayed extensions.

As specified in 3GPP TR 36.814 [3], for inband relaying, the eNB(eNodeB or base station)-to-relay node link operates in the same frequency spectrum as the relay node-to-user equipment (UE) link. Due to the relay transmitter causing interference to its own receiver, simultaneous eNB-to-relay node and relay node-to-UE transmissions on the same frequency resource may not be feasible usually. Similarly, at the relay node it may not be possible to receive eNB transmissions simultaneously with the relay node transmitting to the UE.

One possibility to handle the interference problem is to operate the relay such that the relay is not transmitting to terminals when it is supposed to receive data from the eNB, that means to create "gaps" in the relay-to-UE transmission. These "gaps" during which terminals are not supposed to expect any relay transmission can be created by configuring MBSFN subframes. eNB-to-Relay transmissions can be facilitated by not allowing any relay-to-terminal transmissions in some subframes. The allocation of the subframes to one kind of transmission is fixed. However when the traffic volume of the eNB-to-relay transmission (backhaul link) decreases in a short term, the pre-configured MBSFN subframe resource would be redundant. If these redundant MBSFN subframes can be managed to be used as subframes for the relay-to-terminal transmission (so called downlink access subframes), on the one hand, eNB can serve its associated UEs with more access resource, and on the other hand, RN can change the occasions of backhaul link to access link so as to provide more access resource and support larger access throughput.

There may be a need for providing a reliable and flexible method of changing a timeslot type or subframe type according to a received information within a mobile network.

SUMMARY OF THE INVENTION

This need may be met by the subject matter according to the independent claims. Advantageous embodiments of the present invention are described by the dependent claims.

According to a first aspect of the invention there is provided a relay node for changing a timeslot type according to a received information, wherein the relay node is adapted for receiving signals during timeslots of a first type and for transmitting signals to a connected user equipment during timeslots of a second type differing from the first type of timeslots, wherein the relay node is adapted for receiving information indicating a change of the timeslot type, and wherein the relay node is adapted for changing the timeslot type according to the received information.

According to a second aspect of the invention there is provided a mobile network, in particular an LTE network, comprising a relay node and a base station, wherein the relay node is adapted for receiving signals from the base station during timeslots of a first type and for transmitting signals to a connected user equipment during timeslots of a second type differing from the first type of timeslots, wherein the base station is adapted for transmitting signals to the relay node during timeslots of the first type, wherein the base station is adapted for sending information to the relay node indicating a change of the timeslot type, and wherein the relay node is adapted for changing the timeslot type according to the received information.

These aspects of the invention are based on the idea to flexibly adjust a resource sharing between eNB or base station or eNodeB or Donor eNB and relay node or RN. One noticeable aspect may be that the idea of adjustment is similar to the discontinuous reception (DRX) mechanism in Rel-8 MAC specification which aims to reduce power consumption at terminals by switching off monitoring physical layer control channel in some period. However, in this aspect of present application, eNB and RN may change the resource pre-configured for backhaul traffic, that means the traffic between eNB and RN on the backhaul link, also called Un link, to that for access link, that means the link between RN and UE, also called Uu link, which is unlike in DRX where UE shuts down the reception of access link. With this embodiment, a flexible resource sharing between backhaul link and access link may be provided rather than deliberately for power saving.

The relay node may be adapted for receiving signals from the base station during timeslots of a first type and for transmitting signals to a connected user equipment during timeslots of a second type differing from the first type of timeslots. The relay node may serve one or more user equipments. The base station may be adapted for transmitting signals to the relay node during timeslots of the first type. If the traffic between eNB and RN decreases, the base station may send information to the relay node indicating that a change of the timeslot type is required so that the timeslots do not remain unused. The relay node may be further adapted for changing the timeslot type according to the received information, for example from backhaul link to access link.

In the following there will be described exemplary embodiments of the present invention.

According to an embodiment of the invention, the relay node is connected with a plurality of network elements and is adapted for changing the timeslot type for each network element.

Thus, a multi-hop relaying scenario may be realized, in which for a relay node, the resources for communication with other network elements can be adjusted flexibly, by performing different adjustments as described below in further detail.

According to a further embodiment of the invention, the base station and/or the relay node are adapted to send signals to connected user equipments during timeslots of the second type.

By sending signals to user equipments (UE) during timeslots of the second type, interferences between signals transmitted to the UEs and signals transmitted between the base station or eNodeB or eNB and the relay node or RN may be avoided. The timeslots of the first type may provide gaps in the UE-to-relay transmission. During these timeslots only transmission between eNB and RN may be allowed.

According to a further embodiment, the signal is arranged as a plurality of frames, each frame comprising subframes of a first type allowing a transmission from the base station to the relay node and subframes of a second type allowing a transmission from the relay node to the connected user equipment.

The gaps provided by the timeslots of the first type as mentioned above may be created by configuring MBSFN (multimedia broadcast multicast service single frequency network) subframes in a specific way, which is explained in detail below. Relay-to-eNB transmissions may be facilitated by not allowing any terminal-to-relay transmissions in some subframes. The subframes for the timeslots of the second type may be normal subframes, which may be called downlink access subframe.

According to a further embodiment, the signals comprise a control signaling comprising the information sent by the base station for indicating a change of the timeslot type.

A specific field may be defined in an L1/L2 control channel, for example a physical controlling channel (like PDCCH) element or MAC control element, to indicate the change from MBSFN subframe to downlink access subframe, which means changing some of the timeslots of the first type in timeslots of the second type. This indication may be valid in a certain following period in which all the MBSFN subframes are changed to downlink access subframes.

According to a further embodiment, the control element comprises the information during a timeslot of the first type indicating that a specified number of the following timeslots of the first type is changed to timeslots of the second type.

In this embodiment, the control element may indicate during a timeslot of the first type or a MBSFN subframe that for example the following two timeslots of the first type or MBSFN subframes should be changed to timeslots of the second type or downlink access subframes so that the communication or transmission between RN or eNB and UEs may be increased. This way of changing the timeslot type may be called explicit adjustment.

Further, the control element may be sent in a small-latency signaling channel. This small-latency signaling channel may lie typically in the low layer in the radio protocol stack.

According to a further embodiment, the base station is adapted for sending the signal comprising the control element to a plurality of relay nodes. With this embodiment, it may be realized that a single RN, a group of RNs or all RNs may be controlled by the signal comprising the control element.

According to a further embodiment, the signals comprise cycles, wherein each cycle includes one or more radio frames and comprises one or more timeslot of the first type and one or more timeslots of the second type, and the information indicating a change of the timeslot type corresponds to the absence of payload data during the timeslot of the first type.

A cycle (called adjustment cycle), which relies on a MAC timer or counter, may be pre-configured by eNB to all RNs. The beginning offsets at RNs may be set individually with for example their identifications. The presence of payload data may indicate that the timeslots of the first type are used and its length may be required to be extended. In the end of the timeslots of the first type, the absence of payload data may indicate a change of the timeslot type from the first type to the second type. This way of changing the timeslot type may be called implicit adjustment.

According to a further embodiment, the relay node is adapted for monitoring the presence or absence of payload data and for changing the timeslot type according to the absence of payload data in the end of the timeslots of the first type. The absence of payload data may be a simple indicator if a change of the timeslot type is meaningful. Monitoring the presence or absence of payload data may also be seen as monitoring the status of payload data.

According to a further embodiment, each cycle comprises an active period corresponding to one or more timeslots of the first type, and the relay node is adapted for increasing the active period according to the presence of payload.

Every cycle or sequence of subframes within a cycle may begin with a period called active-time or active period, during which the relay node may be required to prepare for the downlink backhaul reception in MBSFN subframes. In the rest time of a cycle following active-time, relay node may change pre-configured MBSFN subframes to downlink access subframes. The total length of active-time may be composed of one basic period and several incremental periods, where the increment may be activated by the backhaul traffic or presence of payload data. A maximum length of active-time may be set per each adjustment cycle. The length of the active period or active-time may be composed of one basic period and several incremental periods, where the increment may be activated by presence of payload data, and may be limited by a maximum threshold.

According to a further embodiment, the signals comprise a control element comprising the information sent by the base station for indicating a change of the timeslot type in addition to the implicit adjustment. With this embodiment, the features of the explicit and the implicit adjustment may be combined in a synergistic way.

According to a further embodiment, the control element comprises the information during a timeslot of the first type in the active period indicating that a specified number of the following timeslots of the first type is changed to timeslots of the second type.

The control element may be send in addition to the implicit adjustment so that the timeslots are not only changed in response to the absence of payload data but also may be changed in response to an explicit control signal.

According to a further embodiment, the base station is adapted for sending the signal comprising the control element to a plurality of relay nodes in addition to the implicit adjustment, which is preferably only provided between a specific eNB and a specific relay node.

According to a further aspect of the invention there is provided a method of changing a timeslot type according to a received information within a mobile network, in particular an LTE network, wherein the mobile network comprises a relay node and a base station. The method comprises transmitting signals from the base station to the relay node during time-slots of a first type, receiving signals from the base station during timeslots of the first type, transmitting signals from the relay node to a connected user equipment during timeslots of a second type differing from the first type of timeslots, sending information to the relay node indicating a change of the timeslot type, and changing the timeslot type according to the received information.

According to a further aspect of the invention there is provided a computer-readable medium (for instance a CD, a DVD, a USB stick, a floppy disk or a hard disk), in which a computer program of changing a timeslot type according to a received information within a mobile network, in particular an LTE network, is stored, which computer program, when being executed by a processor, is adapted to carry out or control a method of changing a timeslot type according to a received information within a mobile network, in particular an LTE network.

According to a further aspect of the invention there is provided a program element (for instance a software routine, in source code or in executable code) of changing a timeslot type according to a received information within a mobile network, in particular an LTE network, which program element, when being executed by a processor, is adapted to carry out or control a method of changing a timeslot type according to a received information within a mobile network, in particular an LTE network.

Changing a timeslot type according to a received information within a mobile network, in particular an LTE network, which may be performed according to aspects of the invention can be realized by a computer program, that is by software, or by using one or more special electronic optimization circuits, that is in hardware, or in hybrid form, that is by means of software components and hardware components.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

FIG. 4A shows a MBSFN configuration of a frame.
FIG. 4B shows a frame with changing the timeslot type according to an embodiment of the invention.
FIG. 4C shows a frame with changing the timeslot type according to a further embodiment of the invention.
FIG. 4D shows a frame with changing the timeslot type according to a further embodiment of the invention.

DETAILED DESCRIPTION

Figure 1:
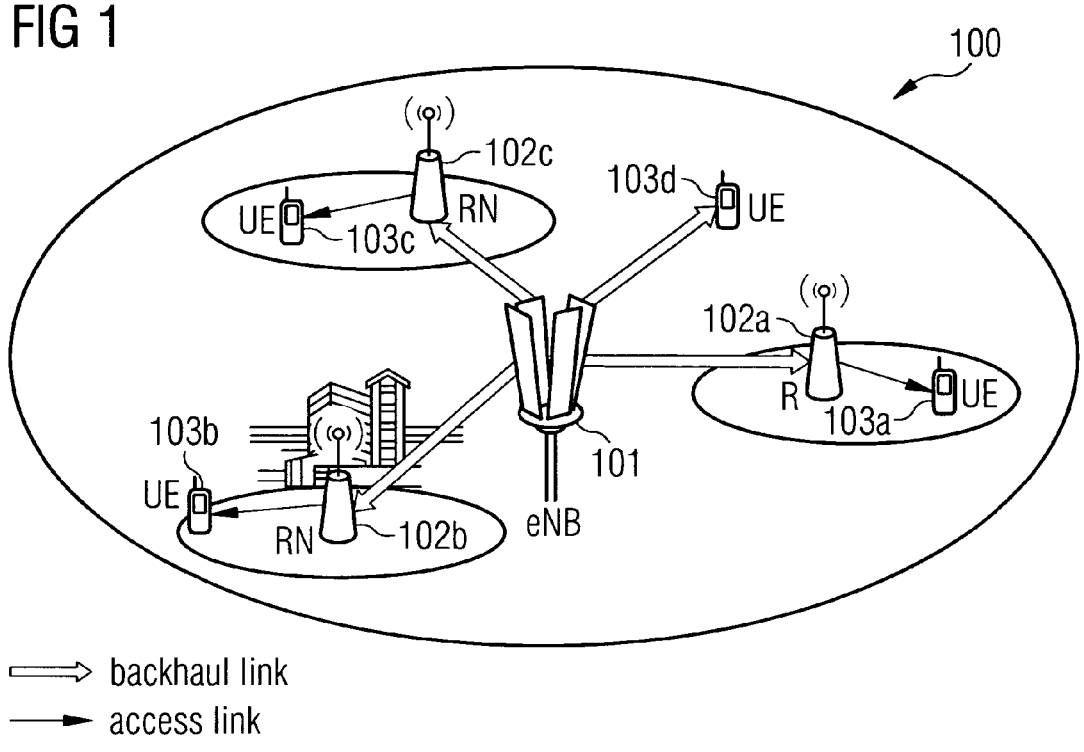
FIG. 1 shows an overview of a LTE radio access network.

The illustration in the drawing is schematically. It is noted that in different figures, similar or identical elements are provided with reference signs, which are different from the corresponding reference signs only within the first digit.

FIG. 1 shows a system overview of an LTE (long term evolution) RAN (radio access network) 100. Relaying technique has been proposed as one of the key candidate features in LTE-advanced systems. The network 100 comprises a base station or eNB 101. The eNB 101 may be connected with a user equipment (UE) 103d directly or via relay nodes (RN) 102a, 102b, 102c indirectly 103a, 103b, 103c, wherein the RNs serve as radio relayed extensions. RNs may overcome excessive buildings (102b, 103b), increase the througput in hotspots (102c, 103c) or extend the coverage (102a, 103a).

L3 or higher layer relaying could almost be considered as wireless base stations and support all the protocol layers of normal base stations, as it is assumed in this invention. In L3 relay, the RN may be assumed to have thorough scheduling capability to the access links of its associated UEs.

As specified in 3GPP TR 36.814, relaying is considered as one of the potential techniques for LTE-A, where RN is wirelessly connected to the radio-access network via a donor cell. "Type 1" RN may be an inband relaying node characterized by separate physical cell ID, support of HARQ (hybrid automatic repeat request) feedback etc.

The interface between UE and RN may be named as Uu interface and the link may be an access link. While between RN and eNB or DeNB (Donor-eNB), the link may be considered as backhaul link and this interface may be denoted as Un interface.

For inband relaying, the eNB-to-relay link may operate in the same frequency spectrum as the relay-to-UE link. Due to the relay transmitter causing interference to its own receiver, simultaneous eNB-to-relay and relay-to-UE transmissions on the same frequency resource may not be feasible usually. Similarly, at the relay it may not be possible to receive UE transmissions simultaneously with the relay transmitting to the eNB.

Figure 2:
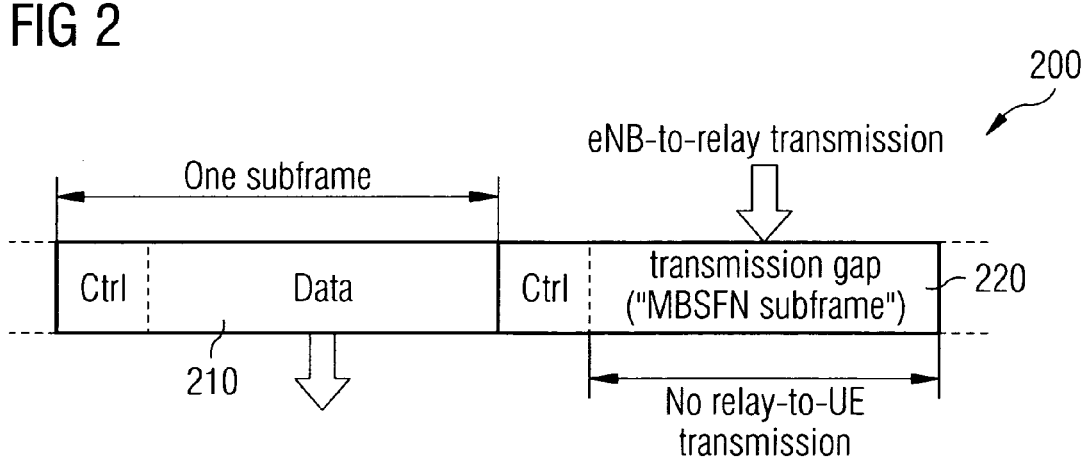
FIG. 2 shows a frame being used in an embodiment of the invention.

One possibility to handle the interference problem may be to operate the relay such that the relay is not transmitting to terminals when it is supposed to receive data from the Donor-eNB, that means to create "gaps" in the relay-to-UE transmission. These "gaps" during which terminals are not supposed to expect any relay transmission may be created by configuring MBSFN subframes as exemplified in FIG. 2 showing a frame being used in an embodiment of the invention. Relay-to-eNB transmissions may be facilitated by not allowing any terminal-to-relay transmissions in some subframes. The subframe 210 is used for relay-to-UE communication comprising a control field and a data field. For the eNodeB-to-relay communication the MBSFN subframe 220 is used. The structure of the MBSFN subframe 220 includes the first two OFDM symbols as the resource for physical control channel in access link and the rest OFDM symbols for the resource in backhaul link. In this way, the necessary downlink L1/L2 control signalling for access link, such as power control and UL grant in PDCCH and ACK/NACK feedback in PHICH, can avoid being suspended.

The available occasions for MBSFN subframes in a frame may follow for example the rules:
In FDD, subframe 0, 4, 5, 9 can not be configured as MBSFN. In this way, the rest six subframes are possible.
In TDD, subframe 0, 1, 5, 6 can not be configured as MBSFN. Since subframe 2 is always a UL subframe in all TDD frame structures, the rest five subframes are possible.

In both Donor-eNB (DeNB) cell and RN cell, some downlink subframes for access (called downlink access subframes) may be configured as MBSFN subframes serving as backhaul occasions for transmission from eNB to RN. In these MBSFN subframes, downlink access traffic may be suspended. However, in general cases, the MBSFN subframe configuration which is informed by system information is semi-static, and it would take several or even tens of TTIs (transmission time intervally) to make UE and RN aware of the updated MBSFN subframe configuration; the traffic volumes of backhaul link and access link vary relatively quickly, and especially when a few UEs are associated in the RN cell, the traffic in backhaul link often arrives as a sequence of bursts; to guarantee sufficient resource for backhaul link, MBSFN subframe should be pre-configured to a relatively large proportion out of every frame. Since backhaul link and access link share the same pool of resource, the larger portion the backhaul link accounts for, the smaller portion is left for access link and the lower throughput is resulted in at the original DeNB cell.

Figure 3A:
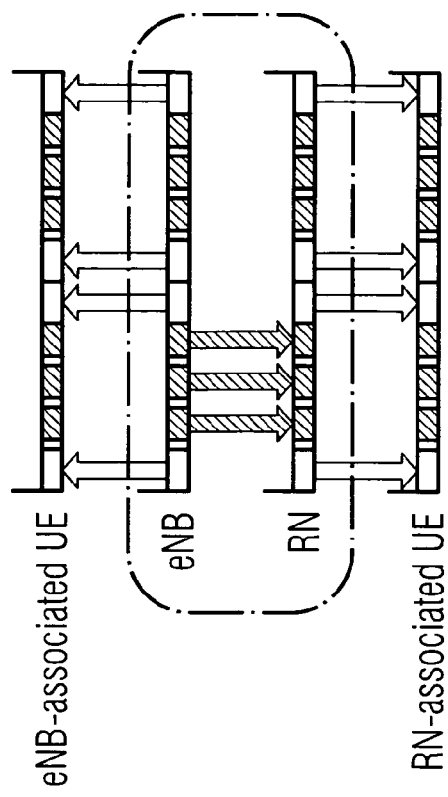
FIG. 3A shows a frame without changing the timeslot type with backhaul traffic.
Figure 3B:
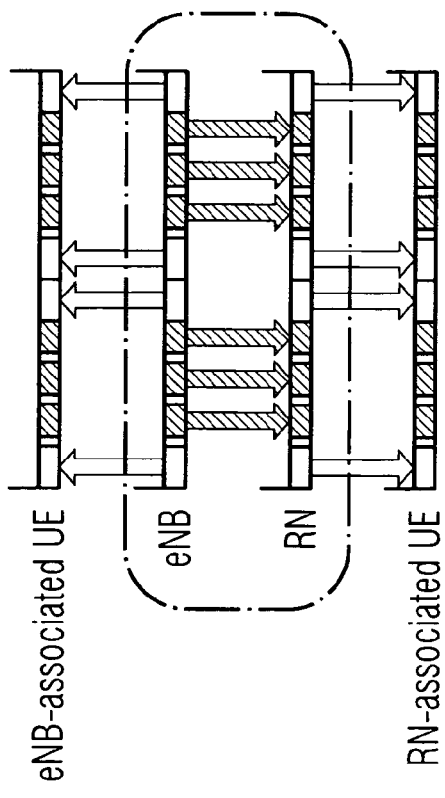
FIG. 3B shows a frame without changing the timeslot type with backhaul traffic only in a part of the subframes.

FIGS. 3A and 3B show an example of resource sharing between backhaul link and access link regarding FDD frame structure. In FIG. 3A, at most six MBSFN subframes can serve as backhaul occasions. In FIG. 3B, a part (here shows three) of them are used in practice, leading to the resource waste on the unused MBSFN subframes. Nevertheless, once the MBSFN subframe configuration is given by the estimation of both backhaul traffic and access traffic volumes, its adjustment via RRC signaling should be quite slow and takes a relatively long time, for example tens of TTIs.

However, when the backhaul traffic volume decreases in a short term, the pre-configured MBSFN subframe resource would be redundant. If these redundant MBSFN subframes can be managed to "return" as downlink access subframe, on the one hand, DeNB may serve its associated UEs with more access resource and on the other hand, RN can change the occasions of backhaul link to access link so as to provide more access resource and support larger access throughput.

In FIGS. 4A to 4D three procedures according to embodiments of the invention are illustrated. With these procedures, a short-term adjustment may be realized. The duration of an MBSFN configuration is assumed to be one frame, and six MBSFN subframes are pre-configured per each frame. For simplicity, the adjustment cycle is configured just right to align with the MBSFN configuration period. The lengths of both basic period and incremental period in active-time equal one MBSFN subframe. The maximum length of active-time equals three MBSFN subframes.

FIG. 4A shows a normal distribution of a frame without any adjustment. In FIG. 4B, an explicit adjustment via L1/L2 control signaling is provided. In the backhaul link (Un interface), a specific field is defined in L1/L2 control channel, for example physical controlling channel (like PDCCH) or MAC control element, to indicate the change from MBSFN subframe to downlink access subframe. This indication may be valid in a certain following period in which all the MBSFN subframes are changed to downlink access subframes, and it can control a single RN or a group of RNs or even all RNs. In the access link (Uu interface), DeNB and RN can schedule their respective associated UEs for downlink transmission via PDCCH at those new downlink access subframes changed from MBSFN subframes.

FIG. 4C illustrates the implicit adjustment via MAC timer or counter. In the backhaul link, a cycle (called adjustment cycle) which relies on a MAC timer or counter is pre-configured by eNB to all RNs. The cycle may have the same length as the frame comprising several subframes. The beginning offsets of RNs can be set individually with for example their identifications. Every cycle begins with a period called active-time or active period during which RN is required to prepare for the downlink backhaul reception in MBSFN subframes. In the rest time of a cycle following active-time, RN can change pre-configured MBSFN subframes to downlink access subframes. The total length of active-time is composed of one basic period and several incremental periods which are activated by the backhaul traffic. A maximum length of active-time may be set per each adjustment cycle. In the access link, DeNB and RN can also schedule their respective associated UEs for downlink transmission via PDCCH at those new downlink access subframes changed from MBSFN subframes.

FIG. 4D shows a combination of the FIGS. 4B and 4C, called hybrid adjustment. In addition to the implicit adjustment approach, during the active-time of every cycle, eNB can indicate explicitly the change from MBSFN subframe to downlink access subframe via L1/L2 control signaling in the backhaul link. The procedure in the access link remains as in the explicit and implicit adjustment procedures.

The described method may be provided on a computer-readable medium, in which a computer program of changing a timeslot type according to a received information within a mobile network is stored, which computer program, when being executed by a processor, is adapted to carry out or control the method. Also, a program element of changing a timeslot type according to a received information within a mobile network may be provided, which program element, when being executed by a processor, is adapted to carry out or control such a method.

The idea of implicit adjustment is similar to the DRX mechanism in Rel-8 MAC specification. However, in the invention, eNB and RN may change the resource pre-configured for backhaul traffic to that for access link, which is unlike in DRX where UE shuts down the reception of access link. The purpose of this invention is for flexible resource sharing between backhaul link and access link rather than deliberately for power saving.

The explicit adjustment may provide a flexible adjustment, as L1/L2 signaling may be sent in any MBSFN subframe, thus any MBSFN subframe may be changed to downlink access subframe. The implicit adjustment may provide the advantage that a backhaul link overhead does not increase.

In the proposed implicit and hybrid adjustment methods, some parameters may be required to be sent from DeNB to RNs, including the length of adjustment cycle, cycle offset, the lengths of basic period and incremental period in active-time. In addition, to multiplex multiple RNs which are expected to perform downlink backhaul transfer in different MBSFN subframes, different cycle offsets may be set to them correspondingly.

Further, the application of the proposed adjustment methods can be generalized to the multi-hop relaying scenarios, in which for a network element, the resources for communication with other network elements can be adjusted flexibly.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:
1. An apparatus comprising:
one or more processors, and
one or memories including computer program code, the one or more memories and the computer program code being configured, with the one or more processors, to cause the apparatus to perform the following:
receive signals during timeslots of a first type and transmit signals to a connected user equipment during timeslots of a second type differing from the first type of timeslots, receive information indicating a change of the timeslot type, and change the timeslot type according to the received information, wherein the signals comprise cycles, wherein each cycle comprises one or more radio frames and comprises one or more timeslots of the first type and one or more timeslots of the second type, and wherein the information indicating a change of the timeslot type corresponds to the absence of payload data in the end of the timeslots of the first type.

2. A network comprising a first apparatus and a second apparatus, wherein said first apparatus comprises:

one or more processors, and one or memories including computer program code, the one or more memories and the computer program code being configured, with the one or more processors, to cause the first apparatus to perform the following:

receive signals from the second apparatus during timeslots of a first type and transmit signals to a connected user equipment during timeslots of a second type differing from the first type of timeslots, receive information indicating a change of the timeslot type, and change the timeslot type according to the received information, and wherein said second apparatus comprises:

one or more processors, and one or memories including computer program code, the one or more memories and the computer program code being configured, with the one or more processors, to cause the first apparatus to perform the following:

transmit signals to the first apparatus during timeslots of the first type, and send information to the first apparatus indicating a change of the timeslot type, wherein the signals comprise cycles, wherein each cycle comprises one or more radio frames and comprises one or more timeslots of the first type and one or more timeslots of the second type, and wherein the information indicating a change of the timeslot type corresponds to the absence of payload data in the end of the timeslots of the first type.

3. The network according to claim 2, wherein the second apparatus and/or the first apparatus send signals to connected user equipments during timeslots of the second type.

4. The network according to claim 2, wherein the signals comprise a control element comprising the information sent by the second apparatus for indicating a change of the timeslot type.

5. The network according to claim 4, wherein the control element comprises the information during a timeslot of the first type indicating that a specified number of the following timeslots of the first type is changed to timeslots of the second type.

6. The network according to claim 2, wherein the first apparatus monitors the presence or absence of payload data and changes the timeslot type according to the absence of payload data during the timeslots of the first type.

7. The network according to claim 2, wherein each cycle comprises an active period corresponding to one or more timeslots of the first type and wherein the first apparatus increases the active period according to the presence of payload.

8. The network according to claim 2, wherein the signals comprise a control element comprising the information sent by the second apparatus for indicating a change of the timeslot type.

9. The network according to claim 8, wherein the control element comprises the information during a timeslot of the first type in the active period indicating that a specified number of the following timeslots of the first type is changed to timeslots of the second type.

10. The network according to claim 2, wherein the signal is arranged as a plurality of frames, each frame comprising subframes of a first type allowing a transmission from the second apparatus to the first apparatus and subframes of a second type allowing a transmission from the first apparatus to the connected user equipment.

11. A method comprising:

transmitting signals from a base station to the relay node during timeslots of a first type, receiving signals from a base station during timeslots of a first type, transmitting signals from a relay node to a connected user equipment during timeslots of a second type differing from the first type of timeslots, receiving information at the relay node indicating a change of the timeslot type, and changing the timeslot type according to the received information, wherein the signals comprise cycles, wherein each cycle comprises one or more radio frames and comprises one or more timeslots of the first type and one or more timeslots of the second type, and wherein the information indicating a change of the timeslot type corresponds to the absence of payload data in the end of the timeslots of the first type, pg,26 the method being for changing a timeslot type according to a received information within a mobile network, wherein the mobile network comprises the delay node and the base station.

12. A computer program product comprising a non-transitory computer-readable storage medium bearing computer program code embodied therein for use with a computer, the computer program code comprising code for performing the following:

receiving signals from a base station during timeslots of a first type;

transmitting signals from a relay node to a connected user equipment during timeslots of a second type differing from the first type of timeslots;

receiving information at the relay node indicating a change of the timeslot type; and changing the timeslot type according to the received information, wherein the signals comprise cycles, wherein each cycle comprises one or more radio frames and comprises one or more timeslots of the first type and one or more timeslots of the second type, and wherein the information indicating a change of the timeslot type corresponds to the absence of payload data in the end of the timeslots of the first type, the method being for changing a timeslot type according to a received information within a mobile network, wherein the mobile network comprises the relay node and the base station.

* * * * *

UNITED STATES PATENT AND TRADEMARK OFFICE
CERTIFICATE OF CORRECTION

PATENT NO. : 8,958,358 B2  
APPLICATION NO. : 13/380582  
DATED : February 17, 2015  
INVENTOR(S) : Huang et al.

Page 1 of 1

It is certified that error appears in the above-identified patent and that said Letters Patent is hereby corrected as shown below:

In the claims,

Claim 11, col. 10, line 17 "transmitting signals from a base station to the relay node" should be deleted.

Claim 11, col. 10, line 18 "during timeslots of a first type," should be deleted.

Claim 11, col. 10, line 34 "pg,26" should be deleted.

Claim 11, col. 10, line 37 "delay" should be deleted and --relay-- should be inserted.

Signed and Sealed this  
Twelfth Day of May, 2015

Michelle K. Lee  
*Director of the United States Patent and Trademark Office*